United States Patent [19]

Mack

[11] Patent Number: 4,800,677
[45] Date of Patent: Jan. 31, 1989

[54] ANIMAL WASTE COLLECTION PAD

[75] Inventor: Robert J. Mack, Aberdeen, N.J.

[73] Assignee: Colgate-Palmolive Company, New York, N.Y.

[21] Appl. No.: 99,454

[22] Filed: Sep. 21, 1987

[51] Int. Cl.4 .................... A01K 1/015; A01K 29/00
[52] U.S. Cl. ......................................... 119/1; 604/359
[58] Field of Search ................... 119/1, 143; 604/359, 604/360, 389

[56] References Cited

U.S. PATENT DOCUMENTS

| | | | |
|---|---|---|---|
| 2,940,449 | 6/1960 | Thomson | 604/359 |
| 3,585,998 | 6/1971 | Hayford et al. | 604/359 |
| 3,626,900 | 12/1971 | Failla | 119/1 |
| 3,752,121 | 8/1973 | Brazzell | 119/1 |
| 4,055,184 | 10/1977 | Karami | 604/359 |
| 4,186,743 | 2/1980 | Steiger | 604/359 |
| 4,337,771 | 7/1982 | Pieniak et al. | 604/389 X |
| 4,517,919 | 5/1985 | Benjamin et al. | 119/1 |

Primary Examiner—Robert P. Swiatek
Attorney, Agent, or Firm—N. Blumenkopf; M. M. Grill; R. C. Sullivan

[57] ABSTRACT

An animal waste collection pad having a backing sheet of fluid impervious material, a non-woven top sheet thereon. An absorbent pad is disposed on the backing sheet and the pad contains a scent, attractive to dogs. The scent may be provided by a frangible capsule, a micro encapsulated scent incorporated in the pad or a spray applied to the pad. There are tapes or drawstrings attached to the backing sheet for tying the animal waste collection pad into a small compact package for disposal.

3 Claims, 2 Drawing Sheets

ANIMAL WASTE COLLECTION PAD

BACKGROUND OF THE INVENTION

1. Field of the Invention

This invention relates to means for collecting animal waste and, more particularly, to an animal waste collection pad for inducing an animal, such as a dog, to eliminate thereon so that convenient disposal may be obtained.

2. Description of the Prior Art

In recent times, laws have been enacted throughout the country which place with the dog owner the full responsibility for the collection and disposal of his pet's solid waste. Products to facilitate this operation have proliferated, such as pooper scoopers, disposals bags, plastic gloves, etc.

In addition, diapers for human beings are well known and are generally made from an absorbent body of material, such as wood fluff, sandwiched between a fluid impervious backing sheet and a porous top sheet, which may be made from a non-woven material.

It is, therefore, the primary object of the present invention to provide the dog owner with an animal waste collection sheet, which will induce the animal to eliminate thereof, thus facilitating disposal of the animal's waste.

SUMMARY OF THE INVENTION

In order to carry out the invention, there is provided an animal waste collection sheet, including a backing sheet of fluid impervious material having an absorbent pad or body thereon and a non-woven top sheet overlying the absorbent body. A frangible capsule is disposed, preferably adjacent one or more fold lines of said animal waste collection pad. The frangible capsule contains a scent. Means for tying the pad into a small bundle are also provided.

DETAILED DESCRIPTION OF THE INVENTION

Figure 1:
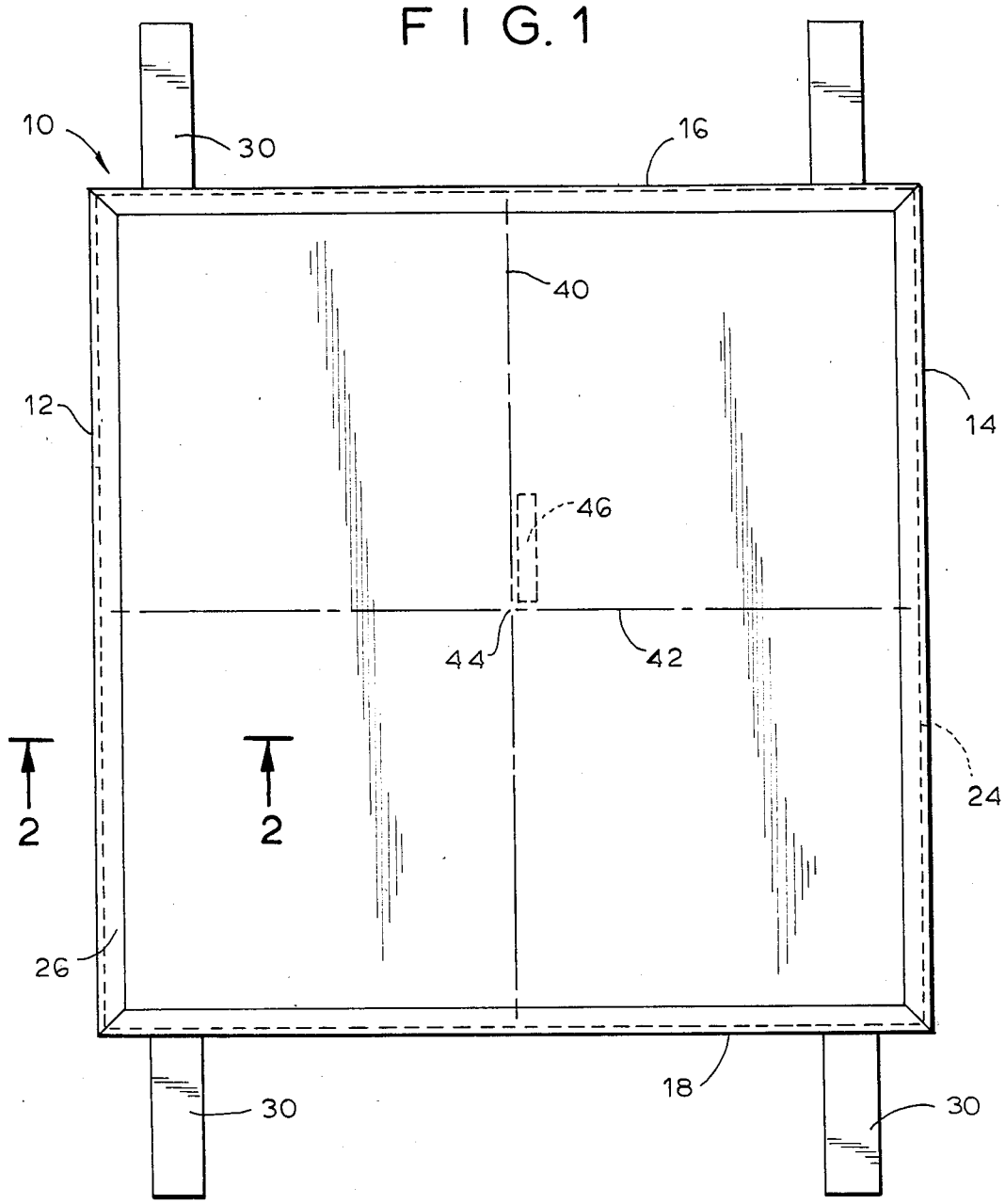
FIG. 1 is a plan view of the animal waste disposal pad.

With continuing reference to the accompanying drawing, wherein like reference numerals designate similar parts throughout the various views, reference numeral 10 generally designates an animal waste collection pad constructed according to the concepts of the present invention. The pad 10 is of a generally square or rectangular shape having end edges 12 and 14, as well as side edges 16 and 18.

Figure 3:
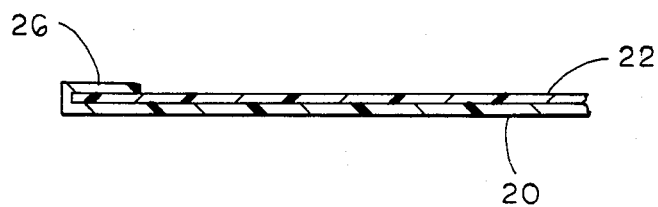
FIG. 3 is a view similar to FIG. 2 showing a modification of the invention.
Figure 4:
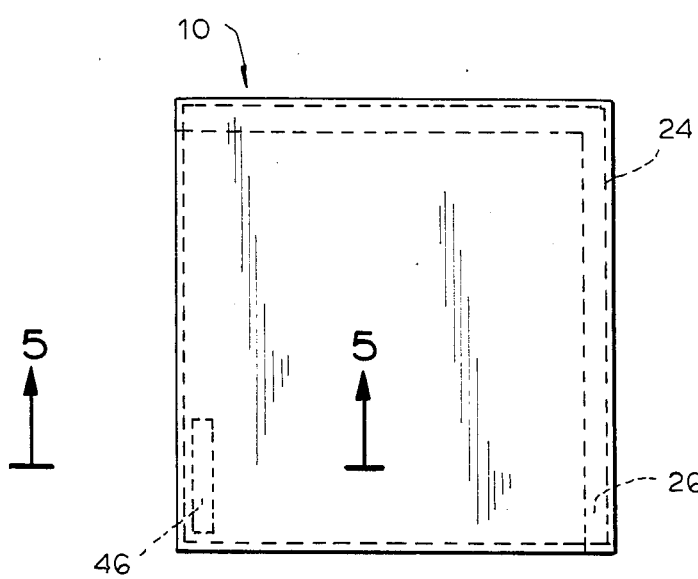
FIG. 4 is a view of the invention shown in a folded position when packaged for merchandising; and, FIG. 5 is a sectional detail view taken along the plane of line 5—5 in FIG. 4.
Figure 5:
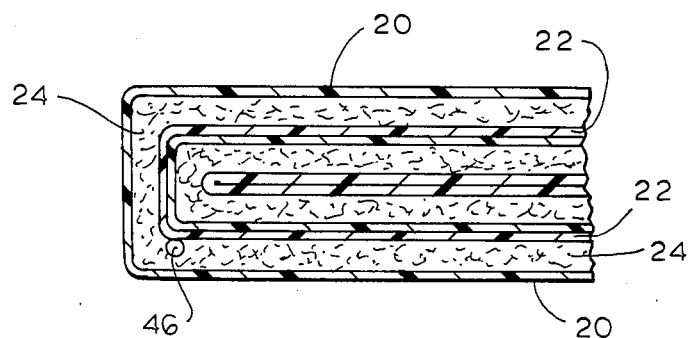

The pad 10 includes a backing sheet 20 of a fluid impervious film-like material, such as extruded polyethylene or polypropylene or the like. A top sheet 22 of non-woven material formed of fibers of suitable material is provided. Sandwiched between the top sheet 22 and the backing sheet 20 is an absorbent pad or body 24 formed of sheets of paper, such as crepe paper, wood fluff or other suitable absorbent material. In a more economic version of the invention, such as shown in FIG. 3, the absorbent body 24 is eliminated.

Figure 2:
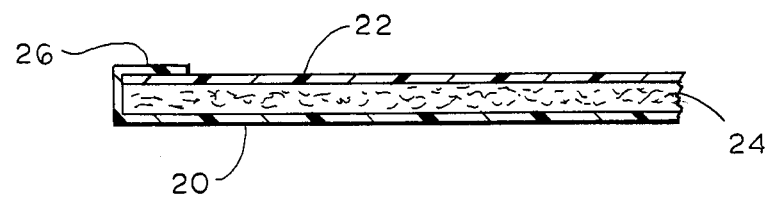
FIG. 2 is a horizontal sectional detail view taken along the plane of line 2—2 in FIG. 1.

As can be seen in FIG. 2, the dimensions of the back sheet 20 are larger than that of the absorbent body 24 or the top sheet 22 so that end sections 26 are folded over the top sheet 22 and bonded thereto, as by adhesives, welding or heat sealing. Drawstrings or tapes 30 are bonded to the backing sheet 20 in alignment with the folded over sections 26, which reinforce the assembly. The tapes or drawstrings are used to conveniently tie the pad 10 into a bundle of small compass for disposal.

Preferably centrally disposed in the pad 10 between the top sheet 22 and the backing sheet 20 is a frangible capsule 46 containing a scented substance used for inducing an animal, such as a dog, to defecate on the pad 10. Such scents as those of pine, urea or ammonia are known to induce defication and/or urination by a dog. The scent-containing substance may preferably be in paste form, so as to remain in the central area of the pad 10.

The pad may be packaged in a folded condition with intersecting fold lines 40 and 42 intersecting at a location 44 wherein the frangible capsule 46 may be located. Since the intersection 44 is at the center of the pad 10, when the pad 10 is in its folded condition, the frangible capsule 46 is easily located at the intersection 44 and may be conveniently grasped and broken.

After the dog has been enticed by the scent from the broken capsule 46 to defecate on the unfolded pad 10, the pad may be folded over the waste material and, using tapes or drawstrings 30, the pad may be tied up to cover and dispose of the waste.

It is advantageous to have adhesive material with peelable strips covering the adhesive so that the pad may be adhered to a floor on which it is positioned. This pad is especially useful when travelling with a pet where no facilities are available for exercising the pet and during periods of inclement weather, such as rain storms, snow storms, etc. A bag for disposal of the pad may be attached to the backing sheet.

Instead of the frangible capsule, the absorbent pad may have a scent attractive to a dog or other pet sprayed thereon—or the scent may be micro-encapsulated.

What is claimed is:

1. An animal waste collection pad comprising a backing sheet of fluid impervious sheet material, an absorbent pad on said backing sheet, porous non-woven top sheet overlying said absorbent pad and a frangible capsule disposed substantially centrally of said waste collection pad, said frangible capsule having a scent carrying substance attractive to pets to induce deposition of waste material on said pad, said animal waste collection pad being provided with intersecting folds folding said animal waste collection pad into quarters, said frangible capsule being located adjacent the intersection of said folds so that said capsule may be easily located and the breakage thereof facilitated, said backing sheet being larger than said absorbent pad or said top sheet, said backing sheet having flap portions folded over said top sheet and bonded thereto, means secured to said backing sheet for tying said backing sheet together in a small package after animal waste has been disposed thereon, said means being bonded to said backing sheet under said flap portions which provide for strengthening of the waste collection pad at locations of securement of said means to said waste collection pad.

2. An animal waste collection pad comprising a backing sheet, a top sheet overlying said backing sheet and a frangible capsule containing a scent attractive to dogs for causing a dog to dispose his waste on said pad, said animal waste collection pad being provided with intersecting folds folding said animal waste collection pad into quarters, said frangible capsule being located adjacent the intersections of said folds, that is, centrally located, so that said capsule may be easily located and the breakage thereof facilitated.

3. An animal waste collection pad comprising a backing sheet, a top sheet overlying said backing sheet and a frangible capsule containing a scent attractive to dogs for causing a dog to dispose his waste on said pad, said animal waste collection pad being provided with intersecting folds folding said animal waste collection pad into quarters, said frangible capsule being located adjacent the intersection of said folds so that said capsule may be easily located and the breakage thereof facilitated, means secured to said backing sheet for tying said backing sheet together in a small package after animal waste has been disposed thereon, said backing sheet being larger than said absorbent pad or said top sheet, said backing sheet having flap portions folded over said top sheet and bonded thereto, said means being bonded to said backing sheet under said flap portions which provide for strengthening of the waste collection pad at locations of securement of said means to said waste collection pad.

* * * * *